United States Patent
Van Nieuwenhuyze

(10) Patent No.: US 11,768,943 B2
(45) Date of Patent: Sep. 26, 2023

(54) SECURE ELEMENT AND METHOD FOR STARTING AN APPLICATION BY A LOW-LEVEL OPERATING SYSTEM

(71) Applicant: Proton World International N.V., Diegem (BE)

(72) Inventor: Olivier Van Nieuwenhuyze, Wezembeek-Oppem (BE)

(73) Assignee: Proton World International N.V., Diegem (BE)

( * ) Notice: Subject to any disclaimer, the term of this patent is extended or adjusted under 35 U.S.C. 154(b) by 0 days.

(21) Appl. No.: 17/457,193

(22) Filed: Dec. 1, 2021

(65) Prior Publication Data

US 2022/0245253 A1 Aug. 4, 2022

(30) Foreign Application Priority Data

Feb. 2, 2021 (FR) ....................... 2100996

(51) Int. Cl.
*G06F 21/57* (2013.01)
*G06F 21/54* (2013.01)
*G06F 21/81* (2013.01)

(52) U.S. Cl.
CPC ............ *G06F 21/575* (2013.01); *G06F 21/54* (2013.01); *G06F 21/81* (2013.01)

(58) Field of Classification Search
CPC ........ G06F 21/575; G06F 21/54; G06F 21/81; G06F 9/445; G06F 21/57
See application file for complete search history.

(56) References Cited

U.S. PATENT DOCUMENTS

| 2004/0236960 A1* | 11/2004 | Zimmer ................ G06F 21/561 713/188 |
| 2013/0077791 A1* | 3/2013 | Kozuka ................. H04L 9/0891 380/277 |
| 2016/0099811 A1* | 4/2016 | Hawblitzel ........... H04L 9/3268 713/176 |
| 2017/0053140 A1* | 2/2017 | Loubet Moundi ...... G06F 21/75 |

FOREIGN PATENT DOCUMENTS

| EP | 2988243 A1 | 2/2016 |
| EP | 3166039 A1 | 5/2017 |
| FR | 3094526 A1 | 10/2020 |
| WO | 2020193664 A1 | 10/2020 |

OTHER PUBLICATIONS

U.S. Appl. No. 17/479,255, filed Sep. 20, 2021.
U.S. Appl. No. 17/479,275, filed Sep. 20, 2021.

* cited by examiner

*Primary Examiner* — Quazi Farooqui
(74) *Attorney, Agent, or Firm* — Slater Matsil, LLP

(57) ABSTRACT

The present description concerns a method of starting a first application configured to be implemented by at least one low-level operating system of a secure element, including the verification of at least a first piece of information updated after each operation of resetting of the secure element, the first piece of information being associated with the at least one low-level operating system.

27 Claims, 7 Drawing Sheets

SECURE ELEMENT AND METHOD FOR STARTING AN APPLICATION BY A LOW-LEVEL OPERATING SYSTEM

CROSS-REFERENCE TO RELATED APPLICATIONS

This application claims the benefit of French Patent Application No. 2100996, filed on Feb. 2, 2021, which application is hereby incorporated herein by reference.

TECHNICAL FIELD

The present disclosure generally concerns electronic devices, and more particularly electronic devices adapted to process secret data. More particularly, the present disclosure concerns electronic devices implementing different applications and, in particular, methods of starting of an application with such an electronic device.

BACKGROUND

A secure element is an electronic device, autonomous or not, adapted to process secret data in secure fashion, that is, without the need for these secret data to be accessible or deduced, for example, by side channel attacks or by penetration. A secure element may be configured to cipher data, for example.

A secure element may be adapted to implement one or a plurality of applications in secure fashion.

It would be desirable to be able to at least partly improve certain aspects of the secure elements, and more particularly certain aspects of the implementation of one or a plurality of applications by a secure element.

SUMMARY

There is a need for secure elements configured to implement a plurality of applications.

There is a need for secure elements configured to implement a plurality of applications, for which the execution of the applications remains secure even after a reboot or a resetting of the secure element.

An embodiment overcomes all or part of the disadvantages of known secure elements.

An embodiment provides a secure element configured to implement a plurality of applications in secure fashion even after a reboot or a resetting of the secure element.

An embodiment provides a method of starting of a first application configured to be implemented by at least one low-level operating system of a secure element, comprising verifying at least one first piece of information updated after each operation of resetting of the secure element, the first piece of information being associated with the at least one low-level operating system.

Another embodiment provides a secure element configured to implement at least one low-level operating system implementing at least a first application, wherein, at each starting of the first application, a first piece of information updated after each operation of resetting of the secure element is verified, the first piece of information being associated with the at least one low-level operating system.

According to an embodiment, the verification of the first piece of information is performed by comparison of the first piece of information with a second piece of information associated with the first application.

According to an embodiment, the comparison between the first piece of information and the second piece of information is performed by the at least one low-level operating system.

According to an embodiment, the comparison between the first piece of information and the second piece of information is performed by the first application.

According to an embodiment, if the verification fails, the at least one second piece of information is updated.

According to an embodiment, the at least one second piece of information is updated by being made equal to the first piece of information.

According to an embodiment, after the update of the at least one second piece of information, the at least one low-level operating system informs the first application that a reset operation has occurred.

According to an embodiment, after having been informed, the first application implements a protocol, taking into account the fact that a reset operation has occurred.

According to an embodiment, at least one third piece of information, associated with the at least one low-level operating system and updated after each operation of resetting of the secure element, is verified at each starting of the first application.

According to an embodiment, the at least one first piece of information is associated with a first type of reset operation, and the third piece of information is associated with a second type of reset operation.

According to an embodiment, the reset operation of a first type is a cold reset operation when an electric power supply of the secure element is stopped.

According to an embodiment, the reset operation of a second type is a warm reset operation where an electric power supply of the secure element is not stopped.

According to an embodiment, the secure element is embedded in an electronic device.

According to an embodiment, the secure element is integrated in an electronic device.

According to an embodiment, the secure element is configured to implement at least one second application.

Another embodiment provides an application configured to be implemented by at least one low-level operating system of a previously-described secure element.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
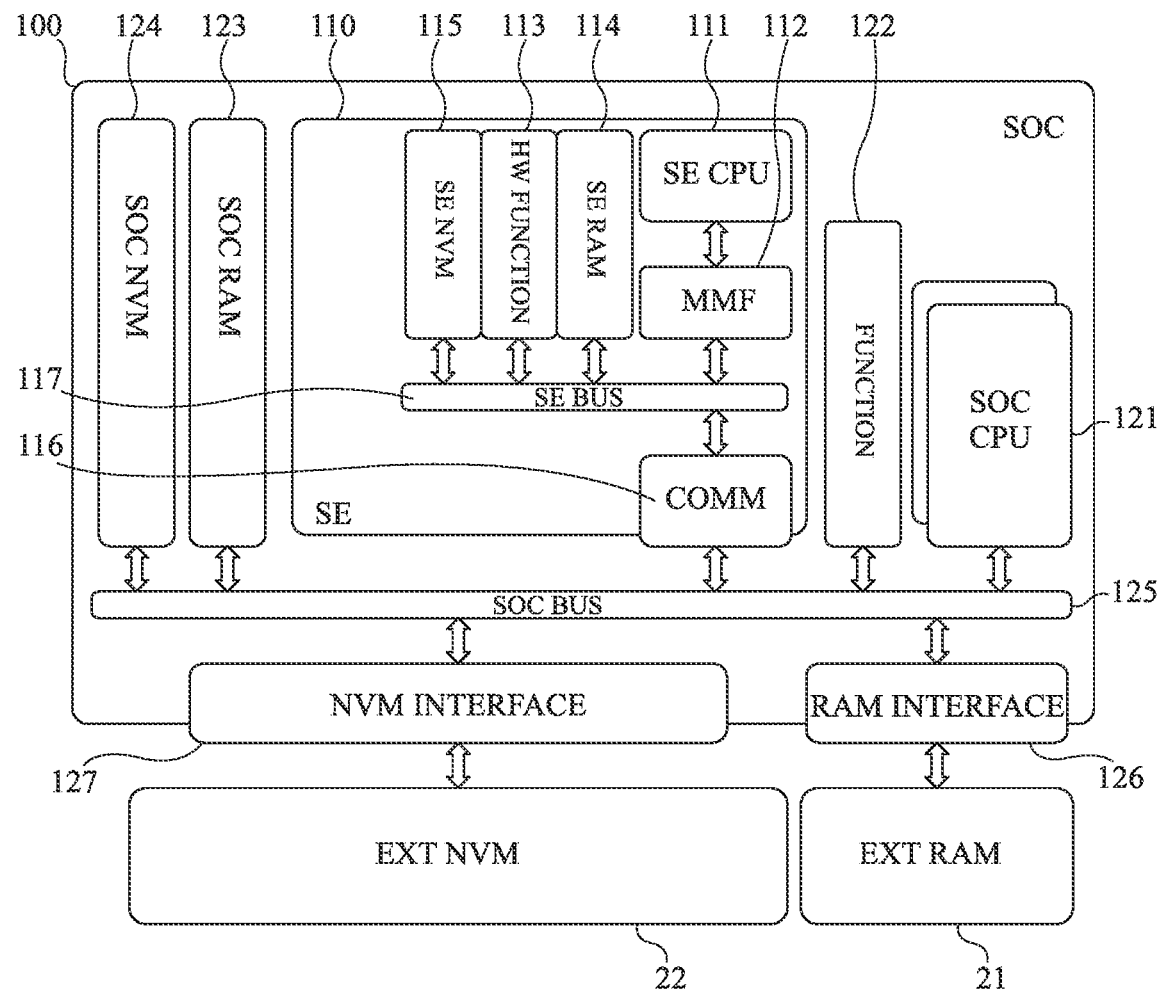
FIG. 1 schematically shows, in the form of blocks, an example of an electronic device of the type to which the described embodiments apply.

FIG. 1 schematically shows, in the form of blocks, an example of an electronic device 100 (SOC) of the type to which the described embodiments apply.

Device 100 is an electronic device formed on one and the same chip (System On Chip—SOC). Device 100 comprises a secure element 110 (SE) which, in this example, is integrated (iSE—integrated Secure Element). Secure element 110 is a secure element integrated in device 100, that is, which may have an autonomous operation in device 100. According to an alternative embodiment, secure element 110 may be embedded, that is, it may use certain hardware resources of device 100 to operate, such as memories, circuits implementing specific functionalities, etc. A more detailed example of embedded secure element 110 is described in relation with FIG. 2.

Secure element 110 is an electronic circuit manipulating secret data which are, for example, ciphered. Secure element 110 comprises at least one processor 111 (SE CPU) adapted to process secret data; a memory management function 112 (MMF) and/or a memory management unit (MMU) (not shown in FIG. 1), capable of managing the reading and the writing of data from and into the memories; one or a plurality of circuits 113 (HW FUNCTION) adapted to implement hardware functionalities (for example, a cryptographic accelerator, a communication cell, etc.) of secure element 110; at least one volatile memory 114 (SE RAM); at least one non-volatile memory 115 (SE NVM); a communication circuit 116 (COMM) adapted to manage the transmissions of data and control signals between secure element 110 and the rest of device 100; and a communication bus 117 (SE BUS) coupling all the elements of secure element 110.

As a variant, integrated secure element 110 is connected to one or a plurality of additional communication buses. For example, the integrated secure element may have a bus according to the ISO7816 standard, connected with a modem of system-on-chip 100, another SWP-type (Single Wire Protocol) bus connected to a near-field communication device (NFC). This case is described in further detail in relation with FIG. 2.

Processor 111 is used to process control signals and data originating from memories 114 and 115, or from other memories comprised within device 100. Processor 111 uses memory management circuit 112 as an intermediary to manage the memory storage of the data and of the control signals, and thus the processor never directly has access to memories 114 and 115. As an example, circuit 112 may for example be used to allocate memory spaces of a volatile memory or of a non-volatile memory to certain applications implemented by the integrated secure element.

Circuits 113 may comprise a multitude of types of circuits and of components, functions enabling to copy data to external memories, cryptographic coprocessors, etc.

Communication circuit 116 may be used as a data receive and transmit chain for secure element 110. Circuit 116 may comprise data reception circuits, data ciphering and/or deciphering circuits, one or a plurality of routers, data conversion circuits.

Device 100 may comprise secure element 110 only, but may also further optionally comprise one or a plurality of processors 121 (SOC CPU) adapted to process data; one or a plurality of circuits 122 (FUNCTION) adapted to implement different functionalities of device 100; one or a plurality of volatile memories 123 (SOC RAM); one or a plurality of non-volatile memories 124 (SOC NVM); and a communication bus 125 (SOC BUS) enabling to exchange and to transmit control signals and data to all the previously-mentioned elements.

For bulk and compactness reasons, device 100 may further be adapted to store data into one or a plurality of external memories. More particularly, device 100 may be adapted to store data into an external volatile memory 21 (EXT RAM) and/or into an external non-volatile memory 22 (EXT NVM). In this case, device 100 further comprises interface circuits adapted to communicate with these external memories 21 and 22. More particularly, device 100 may comprise, in this case, an interface circuit 126 (RAM INTERFACE) adapted to communicate with external volatile memory 21, and/or an interface circuit 127 (NVM INTERFACE) adapted to communicate with non-volatile memory 22.

Secure element 110 may have access to the hardware resources of device 100 to operate, as for example to circuits 122, to memories 123, 124, or even to memories 21 and 22. As previously mentioned, secure element 110 may be integrated to device 100 or embedded in device 100. When secure element 110 is integrated, its non-volatile memory 115 has a very low storage capacity, for example in the order of from 1 to 2 kilo-bytes, its volatile memory 114 has a larger storage capacity, for example, greater than 8 mega-bytes, and circuits 113 are limited to the minimum necessary, or even are not present in secure element 110. To operate, the secure element, when it is integrated, uses the non-volatile memory 124 of device 100 or external non-volatile memory 22 to store data, and the circuits 122 of device 100. Further, when secure element 110 is embedded, its non-volatile memory 115 has a greater storage capacity enabling it to store more data, for example, in the order of 4.5 megabytes, and circuits 113 are present in secure element 110. Thus, secure element 110, when embarked, is autonomous in its operation. Other differences between the integrated secure element and the embedded secure element are described in relation with FIGS. 2 and 3.

Figure 2:
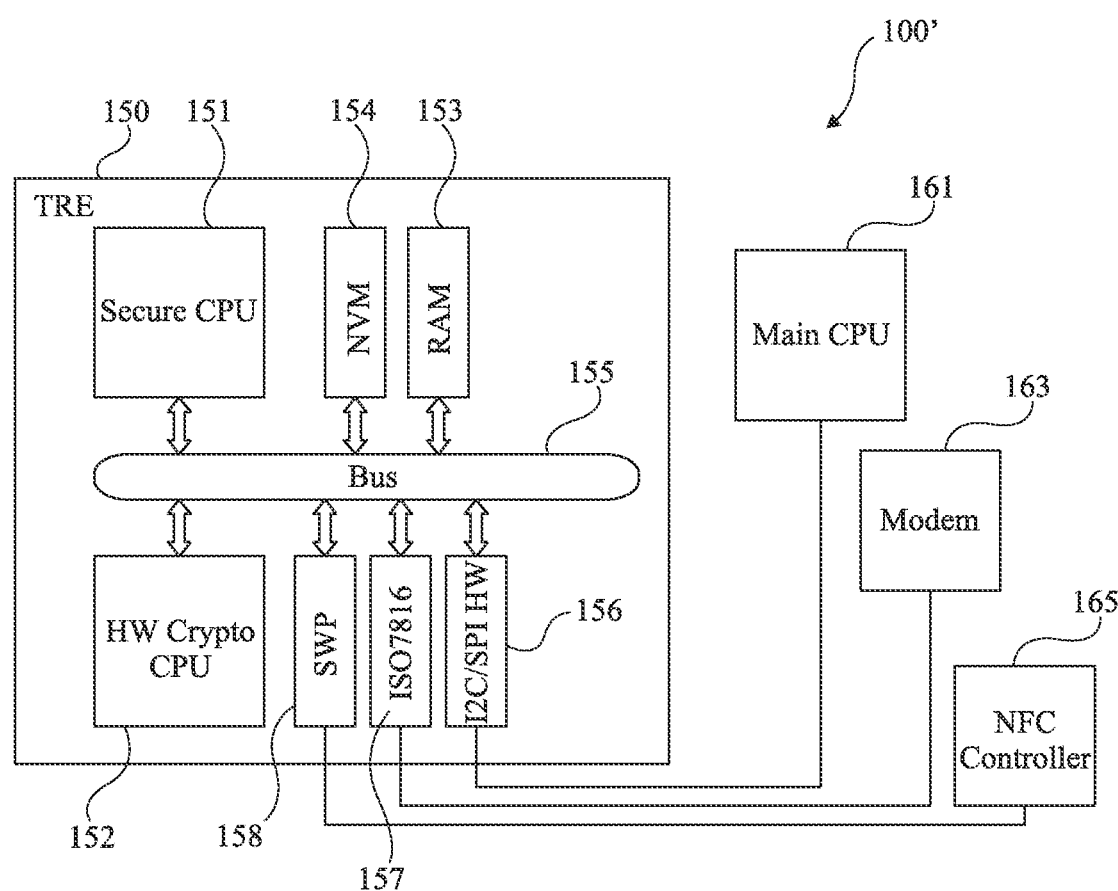
FIG. 2 schematically shows, in the form of blocks, another example of an electronic device of the type to which the described embodiments apply.

FIG. 2 schematically shows, in the form of blocks, another example of an electronic circuit 100' of the type to which the described embodiments apply.

Device 100' comprises various electronic circuits or chips among which are an embedded Secure Element (eSE) 150 forming a tamper resistant element (TRE); a main processor 161 (Main CPU); a modem-type communication circuit 163 (Modem); and a near-field communication circuit 165 (NFC controller).

Embedded secure element 150 is formed of a single chip and integrates, for example, a secure element 151 (Secure CPU); a hardware cryptographic processor 152 (HW Crypto CPU) or cryptographic accelerator; one or a plurality of volatile memories 153 (RAM); one or a plurality of non-volatile memories 154 (NVM); and one or a plurality of buses 155 (Bus) of communication between the different components of element 150.

Element 150 further integrates interfaces of communication with the outside according to various communication protocols, for example, an interface 156 (I2C/SPI HW) of I2C or SPI type of communication with external processor 161; an interface 157 (ISO7816) of communication according to the ISO7816 standard with modem 163; and an SWP-type interface 158 (SWP) of communication with NFC controller 165.

Device 100' may comprise other circuits, integrated or not. For example, embedded secure element 150 may use one or a plurality of external memories (not shown in FIG. 2) with which it communicates directly or via the main processor.

Conversely to an integrated secure element such as the element 110 of FIG. 1, an embedded secure element 150 is not integrated with the other components of device 100' and particularly the main processor of the application.

Embedded secure element 150 may however be combined with a near-field communication controller 165 (NFC).

According to a variant, embedded secure element 150 may comprise memory management elements such as memory management function 112 or the memory management unit described in relation with FIG. 1, enabling to prevent its secure element processor 151 from having a direct access to memories 153 and 154.

Figure 3:
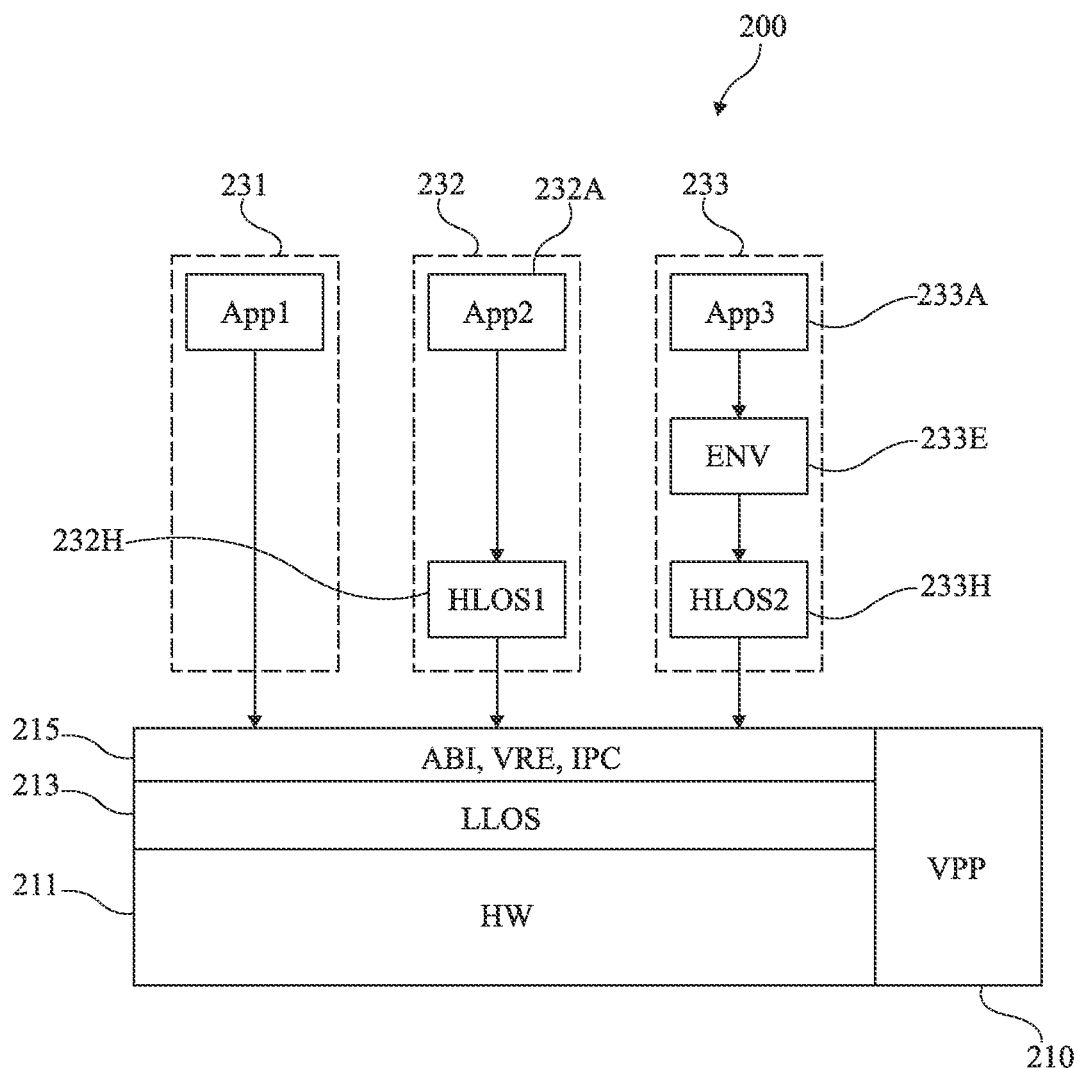
FIG. 3 schematically shows, in the form of blocks, an embodiment of a software architecture of a secure element of an electronic device of the type of those described in relation with FIGS. 1 and 2.

FIG. 3 schematically shows in the form of blocks an embodiment of an architecture 200 of a secure element SE of an electronic device of the type of those described in relation with FIGS. 1 and 2.

Unless specified otherwise, the expression "secure element" indifferently designates hereafter an embedded secure element or an integrated secure element. Thus, the software architecture 200 of secure element SE may be implemented in any of the elements 110 and 150 of the previous drawings.

Architecture 200 comprises a virtual primary platform 210 (VPP) or primary platform 2110, enabling to implement the different functionalities of secure element SE. Primary platform 210 is formed of three levels: the access to electronic components 211 (HW, Hardware) of secure element SE; one or a plurality of low-level operating systems 213 (LLOS); and one or a plurality of software interfaces 215 (ABI, VRE, IPC).

Components 211 are the hardware resources of secure element SE (110, FIG. 1; 150, FIG. 2). The components 211 of secure element 110 are for example one or a plurality of processors, for example, processor 111 (FIG. 1) or 151 (FIG. 2), one or a plurality of memories, for example, memories 114 and 115 (FIG. 1) or 153 and 154 (FIG. 2), one or a plurality of communication devices, such as a communication device enabling to directly communicate with a near-field communication device (NFC), a short-range communication device using, for example, the Bluetooth standard, biometric sensors, a device adapted to the ultra wideband technology (UWB), etc.

Low-level operating systems 213 are software adapted to implement components 211 to execute control signals received from most of the applications implemented by the secure element. As an example, low-level operating systems 213 comprise all or part of the driver software of components 211.

A low-level operating system 213 is formed of an execution code (or executable code) and of execution data. The execution code contains instructions enabling to execute functions of the program. By definition, the instructions are invariable for a given program, except for an update of the program, which then modifies the instructions. The execution data are used by the execution code to contextualize the execution and carry out the desired function. The execution data may be distributed in two categories. Execution data called "temporary" and execution data called "permanent" or "fixed", detailed hereafter.

Primary platform 210 communicates with applications implemented by secure element 110 via software interfaces 215 executed by the primary platform. These interfaces 215 may comprise, among others, application binary interfaces (ABI); registers (VRE, Virtual Register); and storage buffer memories, or buffer memories, or also shared memories allowing a data exchange between processes via inter-process communications (IPC).

A binary-program interface is a low-level interface between the applications implemented by the secure element (described hereafter) and low-level operating systems 213, or between different portions of an application. Binary-program interfaces enables to link the applications and components 211.

The registers are memory spaces linked to a hardware function of the secure element and used to temporarily store data, for example, when a control signal is sent to the primary platform 210 of the secure element or during exchanges between processes executed by the primary platform.

The buffer memories (or shared memories) are used to store messages before their use by platform 210 or by applications of the secure element. In practice, buffer memories are memory spaces allocated in a memory of element 110 or 100', for example, a volatile memory to which element 110 has access, such as memory 114.

As an example, software architecture 200 comprises at least three applications 231, 232, 233 adapted to be implemented by primary platform 210. Applications 231, 232, 233 are software or computer programs using the resources of the primary platform. Of course, the secure element implements a number of applications within the limit of its calculation capacities, and of its data storage capacities.

Like low-level operating systems 213, each application 231, 232, 233 is formed of an execution code (or executable code) and of execution data. The execution code contains instructions enabling to execute functions of the application. By definition, the instructions are invariable for a given program, except for an update of the program, which then modifies the instructions. The execution data are used by the execution code to contextualize the execution and carry out the desired function. As previously mentioned, execution data may be distributed into two categories: execution data called "temporary" and execution data called "permanent" or "fixed". For example, if the function comprises the verification of a PIN code, this function is broken down into three portions, the execution code contains instructions of verification of the PIN code while the permanent execution data contain the reference PIN code and the number of remaining tests, and the temporary execution data contain the PIN code submitted to the verification.

An integrated secure element 110 (FIG. 1) could execute a single application at a time in its internal memories and record the other applications in external memories, which would enable to have a number of applications only limited by the storage capacity of the external memories. The application must previously be loaded into the inner memories before being executed (or resuming the execution) and the previous application must be discharged before being able to use it. Conversely, an embedded secure element 150 (FIG. 2) will prefer the use of its internal memories to store and execute the applications, which implies a more limited quantity of applications, but a faster execution since it will be spoken of an "in place" execution which does not require displacing the application. It however remains possible to combine an embedded secure element with external memories and thus to combine the benefit of internal and external memories.

Applications 231, 232, 233 may be adapted to implement all sorts of functionalities. They generally implement digital services of a service provider, for example, a payment service of EMV or transport ticket type. These applications may be combined with another application located in main processor 121 (FIG. 1) or 161 (FIG. 2) or in another secure environment (Trusted Execution Environment). The processor and the secure environment are more capable of interacting with the user via a trusted user interface. Applications 231, 232, 233 are for example adapted to process control signals originating from communication interfaces, such as, for example, a bank transaction using a near-field communication device. The applications may be of different types, for example, a SIM (Subscriber Identity Module) application, a payment application, an application enabling to validate a public transport ticket, etc.

According to an example of application type, application 231 (App1) is adapted to be directly implemented by primary platform 210 (VPP). Application 231 is for example an application enabling to make payments by communicating with a near-field communication device (NFC).

According to another example of application type, application 232 is a set of instructions 232A (App2) adapted to be executed by using a high-level operating system 232H (HLOS1). A high-level operating system is software adapted to implement different applications by providing a set of common software functions. Operating system 232H is the only portion of application 232 to be communicating with primary platform 210. As a variant, it can also be considered that the high-level operating system, as well as all the applications which are attached thereto, are a single application adapted to be implemented by primary platform 210.

According to another example of application type, another application 233 is a set of instructions 233A (App3) using an execution environment 233E (ENV) which itself uses a high-level operating system 233H (HLOS2). The execution environment is for example of Java or JavaCard type. Operating system 233H and execution environment 233E are the only portions of application 233 to be communicating with primary platform 210. As a variant, it can also be considered that the high-level operating system, as well as all the applications which are attached thereto, are an application adapted to be implemented by primary platform 210.

High-level operating systems 232H and 233H, or applications 232 and 233 themselves if there is no high-level operating system, use virtual images of the memories available for the management of the execution codes and of the execution data. Due to this technique, the high-level operating systems (or the applications) do not have a direct access to the management of physical memories, be they volatile or non-volatile. In other words, in the described embodiments, the high-level operating systems manage a virtual image of the memories. The matching of the physical distribution in volatile and non-volatile memories in ensured by the low-level operating system(s) 213 in combination with certain components 211, like the memory management function 112 described in relation with FIG. 1. More generally, it is considered that primary platform 210 achieves the matching between virtual and physical memories.

The implementation of application 231, 232, or 233 is the following. When an application desires to use a hardware resource of the secure element, that is, one or a plurality of components 211 of primary platform 210, this means that the current operations executed on the fixed data are considered as ended. The application may then execute different orders such as, for example, forcing a writing to a non-volatile memory. For this purpose, the applications sends a control signal and/or data to primary platform 210 via interfaces 215. The control signal is taken in charge by one or a plurality of binary-program interfaces before being sent to the low-level operating systems 213, that is, the order is divided into a plurality of operations, each represented by a binary-program interface or virtual registers, or also a buffer memory/shared memory. The data are stored into registers or transmitted via inter-process communications (IPC). Low-level operating systems 213 respond to the requests of the application binary interfaces by applying the operations requested by the application binary interfaces to the data stored in the registers. Low-level operating systems 213 then drive components 211 to execute what is requested by the application.

It is possible for applications 231, 232, 233 not to communicate with one another within the secure element. Each application 23x (with x varying from 1 to the number of applications likely to be executed) does not know the existence of the other applications 23x. In particular, each operating system of an application "believes" that it is the only one to communicate with the outside. Thus, if the applications had to communicate together, they should do it as if they were discussing from a secure element executing an application 23x towards another element with an application 23x. However, two sub-applications of a same set or application 233 (an application may contain a plurality of sub-applications) use packet communication methods to communicate together by using the IPC inter process communication tools. Each application 231, 232, 233 may communicate with external electronic devices. Packet communication is a data transmission method where sent messages are formed of one or of a plurality of data packets. Each data packet comprises a header comprising information relative to the type of communication protocol used, to the transmitter of the message, to the message receiver, to the message size, etc. Among the different known packet communication protocols, the secure element is likely to use (compatible with) different protocols that may be classified, according to the nature of the protocol, in terms of exchanged information protocol, of application protocol, of communication protocol, of physical link. For example, these protocols include:

- the VNP protocol (Virtual Network Protocol) defined by the "GlobalPlatform Technology Virtual Primary Platform—Network Protocol 1.0.1" standard (or any subsequent version) which corresponds to a protocol of the exchanged information;
- the SWP protocol (Single Wire Protocol), defined by the ETSI TS 102 613 UICC—Contactless Front-end (CLF) Interface—Physical and data link layer characteristics standard, which corresponds to a physical link;
- the communication protocol defined by the ISO7816 standard which covers both the information exchange, the application protocol, the communications, and the nature of the physical link (wireless);
- the HCI (Host Controller Interface) protocol, defined by the ETSI TS 102 612 v12.0 standard (or any subsequent version) which corresponds to an application protocol;
- the CLT protocol, defined by the ETSI TS 102 613 UICC—Contactless Front-end (CLF) Interface—Physical and data link layer characteristics 11.0 standard (or any subsequent version), which corresponds to a communication protocol;
- the sHDLC protocol (Simplified High-Level Data Link Control), defined by the ETSI TS 102 613 (UICC—Contactless Front-end (CLF) Interface—Physical and data link layer characteristics) standard; and
- the ISO7816 protocol defined by standard ISO/IEC 7816; and
- the I2C and SPI protocols which correspond to physical links.

The messages may also be transmitted via a memory playing the role of a communication bus. In other words, a communication bus may be replaced with a memory having the data to be transmitted by the transmit device written into it, and read by the receive device.

The VNP protocol is a communication protocol adapted to operate for the communications of a secure element. It is a protocol capable of managing the routing of the messages within architecture 200 and also towards external devices. This is the preferred communication protocol in a secure element. According to an embodiment, the router comprised within components 211 (in combination with low-level operating systems 213) is a router configured to process messages using the VNP protocol.

The HCI, sHDLC, and CLT protocols are protocols which are in conflict with the VNP protocol, since these protocols are not compatible, the standards do not define the interaction between the two. The result of this conflict shows that the HCI, sHDLC, and CLT protocols are not adapted to manage the routing of the messages within architecture 200. Thus, the router comprised in components 211 cannot support a message using the sHDLC, CLT, and HCI protocols since the information for properly routing the messages within architecture 200 is not present.

The CLT, sHDLC, and HCI protocols, and the protocol defined by the ISO7816 standard are protocols which are not compatible with the use of the VNP protocol. The router comprised in components 211 (in combination with 213) is not capable of supporting a message using the CLT, sHDLC, HCI, and ISO7816 protocols.

Figure 4:
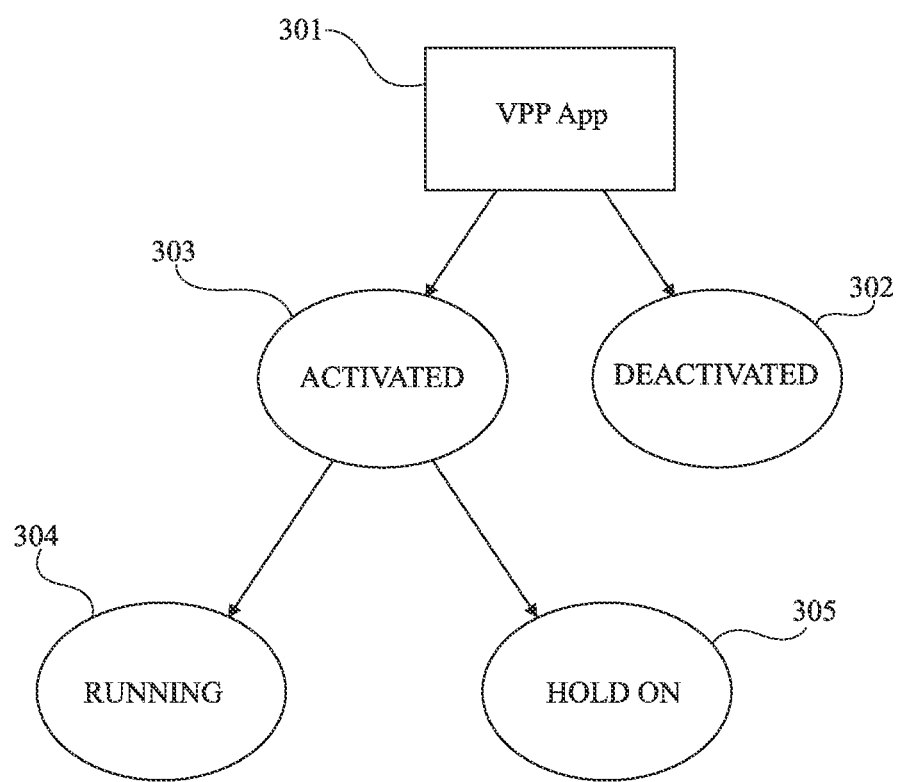
FIG. 4 schematically shows, in the form of blocks, a flowchart illustrating different states of an application implemented by a secure element of an electronic device of the type of those described in relation with FIGS. 1 and 2.

FIG. 4 schematically shows in the form of blocks a flowchart illustrating different states of an application 301 (VPP App) of the type of the applications 231, 232, and 233 described in relation with FIG. 3, executed by a secure element SE of the type of that described in FIG. 1 or in FIG. 2.

Application 301 comprises two primary states: the deactivated state 302 (DEACTIVATED) and the activated state 303 (ACTIVATED).

When application 301 is in deactivated state 302, or is deactivated, it is not being implemented by secure element SE. According to an embodiment, application 301 is in the deactivated state when it has just been installed on secure element SE and it has never been implemented. According to another example, application 301 may be in a deactivated state when it has decided to be set to the deactivated state, for example, when it has just ended a task. More particularly, the execution code and the fixed execution data of application 301 are stored in a non-volatile memory. Two cases then arise. If the secure element is integrated in an electronic device, then all or part of the execution code and of the execution data of application 301 are stored in a non-volatile memory external to secure element SE. According to an example, the execution code and the execution data of application 301 are entirely stored in a non-volatile memory external to secure element SE, like the memory 124 described in relation with FIG. 1. However, if secure element SE is embedded in an electronic device, then the execution code and the fixed execution data of the application are stored in a non-volatile memory comprised in secure element SE, like the non-volatile memory 115 described in relation with FIG. 1, or the non-volatile memory 154 described in relation with FIG. 2.

When application 301 is in activated state 303, or is activated, it is being implemented by secure element SE. Application 301 then comprises two secondary states in which it may be, the running state 304 (RUNNING) and the hold-on state 305 (HOLD ON).

When application 301 is in the running state 304 or is running, application 301 is implemented in the foreground by secure element SE. In the example of FIG. 1, that is, in the example of a secure element integrated in an electronic device, all or part of the execution code and of the fixed execution data of application 301 have been loaded into a volatile memory to be used, for example the volatile memory 114 described in relation with FIG. 1. In the example of FIG. 2, that is, in the example of a secure element embedded in an electronic device, all or part of the execution code and of the fixed execution data of application 301 are executed from the non-volatile memory 154 described in relation with FIG. 2. It is then spoken of an in-place execution of the application. The verb "loading" here means that the execution code and the fixed execution data are copied from the non-volatile memory, and this copy is stored in the volatile memory. Application 301 generates and also uses temporary execution data while it is running, and these temporary execution data are also stored in a volatile memory.

When application 301 is in hold-on state 305, or is on hold, its execution is temporarily stopped, for example, to allow the execution of another application of the secure element. All or part of the execution code and of the fixed and temporary execution data of application 301 are loaded into an area assimilated to a volatile storage space managed by primary platform VPP. When secure element SE is integrated to an electronic device, the area assimilated to a volatile storage space is the volatile memory of the secure element, for example, the volatile memory 114 described in relation with FIG. 1. When secure element SE is embedded in an electronic device, the area assimilated to a volatile storage space is the combination of the volatile memory of secure element SE and of a portion of the non-volatile memory of secure element SE. An example of management of an area assimilated to a volatile storage space in the case where the secure element is embedded is described in further detail in French patent application bearing reference FR1903168, published under reference FR3094526.

When application 301 is on hold, it is not "aware" of being on hold. Application 301 is not aware that its implementation has been stopped by another event, such as the implementation of another application.

Figure 5:
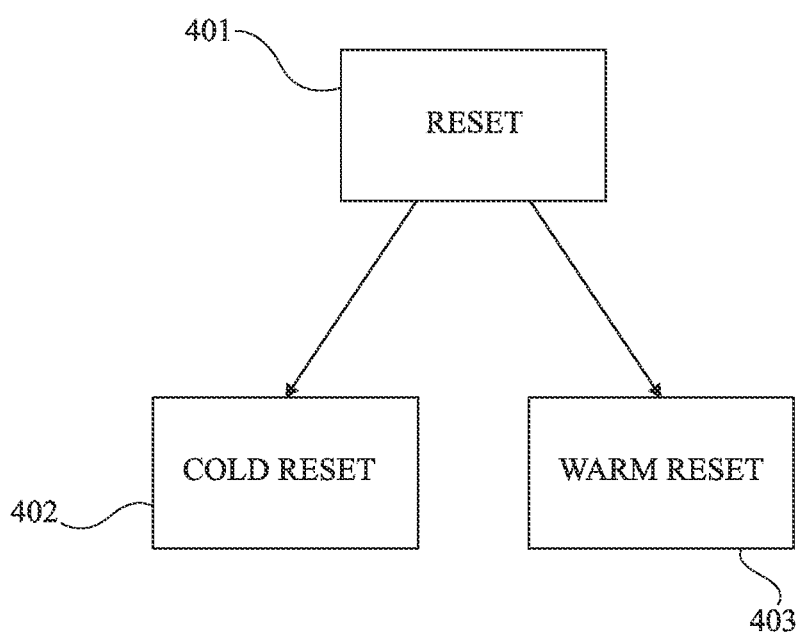
FIG. 5 schematically shows, in the form of blocks, a flowchart illustrating different types of reboot or reset capable of being implemented by an electronic device of the type of those described in relation with FIGS. 1 and 2.

FIG. 5 schematically shows in the form of blocks a timing diagram illustrating different reset operations 401 (RESET) of a secure element SE of the type of those described in FIG. 1 and in FIG. 2.

There exist at least two types of operations of reset of secure element SE: a cold reset operation 402 (COLD RESET); and a warm reset operation 403 (WARM RESET).

During a cold reset operation, or a cold reset, the electric power supply of secure element SE, or especially that of the electronic device comprising secure element SE, is stopped, at least momentarily. With no electric power supply, the volatile memories of secure element SE, and of the electronic device comprising it, are reset, and all the data that they store are erased. Thus, fixed execution and temporary execution data of an active application, that is, of a running or on-hold application, are erased. The non-volatile memories of the secure element, and of the electronic device comprising it, are not reset, since the non-volatile memories have the feature of keeping the data that they store, even after a stopping of the electric power supply of the non-volatile memory. Further, an application which is active, but on hold, may not receive the cold restart instruction.

A warm restart operation, or a warm reset, is a reset performed in software fashion or in hardware fashion, but without comprising a cutting of the electric power supply. This reset may be requested, for example, by a component, an application, or by an instruction originating from an external electronic device. The warm reset may cause the resetting of the volatile memories of the secure element, and of the electronic device comprising it. However, this warm reset being performed by software means an application which active, but on hold, may not receive the warm reset instruction.

Figure 6:
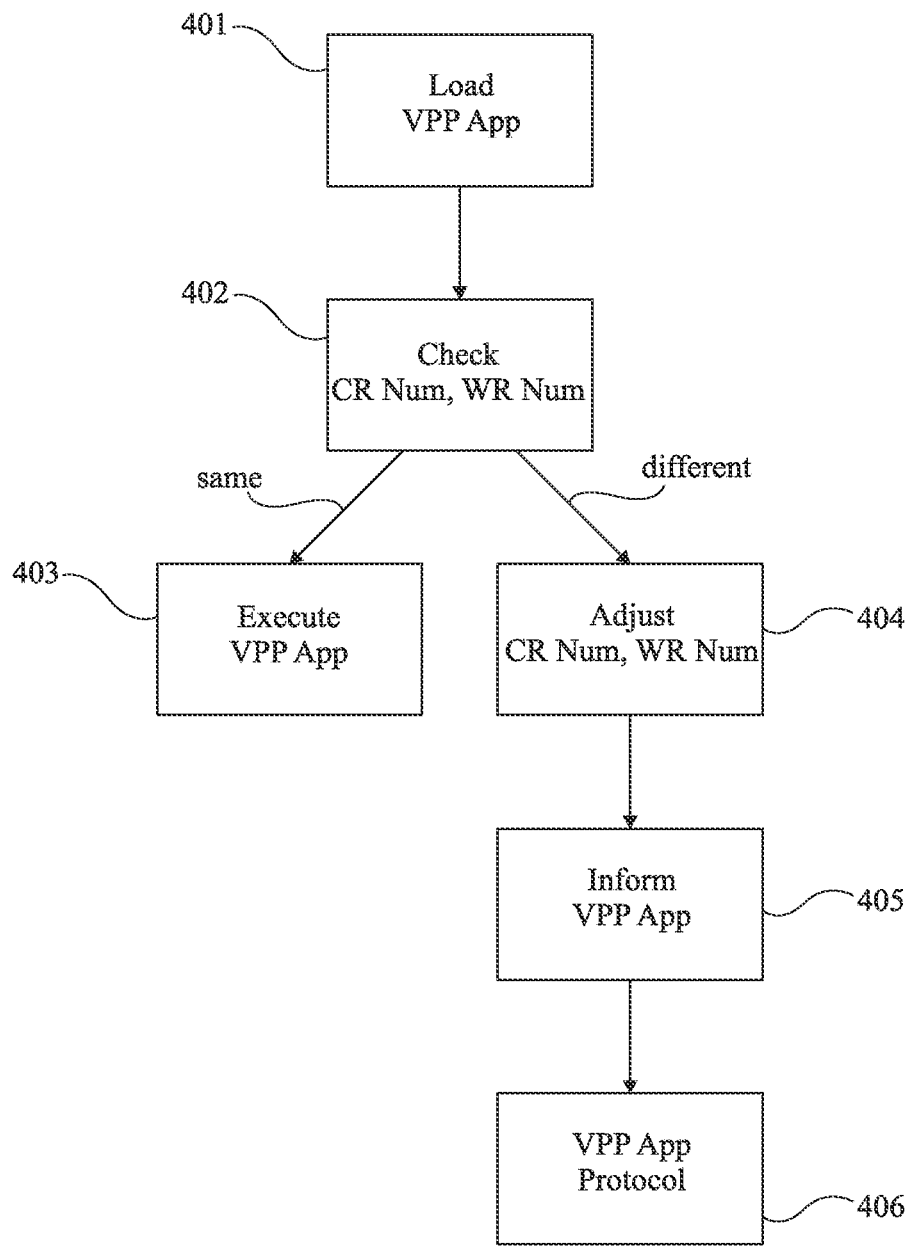
FIG. 6 schematically shows, in the form of blocks, a flowchart illustrating an implementation mode of a method of starting an application with an electronic device of the type of those described in relation with FIGS. 1 and 2.

FIG. 6 is a flowchart illustrating an implementation mode of steps of a method of starting of an application VPP App, of the type of the applications 231, 232, 233 described in relation with FIG. 3, by a secure element SE, of the type of the secure elements 110 and 150 described in relation with FIGS. 1 and 2. Secure element SE comprises a primary platform VPP, of the type of the primary platform 210 described in relation with FIG. 3, adapted to implement application VPP App.

The starting method described herein, or method of launching the execution of application VPP App, is adapted to be taken into account a possible reset operation undergone by secure element SE. Indeed, according to an embodiment, to be taken into account a possible reset operation, primary platform VPP and the applications implemented by secure element SE each have at least one piece of information updated at each reset. According to an example, the piece of information may be updated at each reset, be it a warm reset or a cold reset. According to a variant, the piece of information may be updated at each reset of a certain type, for example, only for a warm reset, respectively a cold reset.

According to an embodiment, primary platform VPP and the applications implemented by secure element SE each have at least one piece of information updated for each cold reset and at least one piece of information updated for each warm reset. More particularly, the information is updated each time the primary platform, respectively the applications implemented by the secure element, are aware that a warm or cold reset operation has occurred. In practice, the primary platform is always aware that a warm or cold reset operation has occurred. The pieces of information are, for example, binary data modified at each cold or warm reset operation. According to an embodiment, the pieces of information each represent the date and the time of the last cold or warm reset. According to another embodiment, the pieces of information are random numbers generated at each cold or warm reset. According to another embodiment, the pieces of information are numbers incremented at each new cold or warm reset. In the following description, the following notations are used:

CR Num VPP, the information of the primary platform VPP implemented at each cold reset;

WR Num VPP, the information of the primary platform VPP implemented at each warm reset;

CR Num, the information of the application VPP App implemented at each cold reset; and WR Num, the information of the application VPP App implemented at each warm reset.

The method of starting application VPP App thus is the following.

At a step 401 (Load VPP App), application VPP App wants to start. If application VPP App was inactive before step 401, it starts loading all or part of its execution code and of its fixed execution data into the non-volatile memory of secure element SE. If application VPP App was on hold before step 401, it starts loading all or part of its execution code and of its fixed execution data into the non-volatile memory of secure element SE.

At a step 402 (Check CR Num, WR Num), successive to step 401, primary platform VPP verifies that its information CR Num VPP and WR Num VPP coincides with the information CR Num and WR Num of application VPP App. By this verification, primary platform VPP verifies whether a cold or warm reset operation has been performed without for application VPP App to have taken it into account. Indeed, when a cold, respectively warm, reset operation is undergone, or implemented, by secure element SE, primary platform VPP is always aware of it, and updates its information CR Num VPP, respectively its information WR Num VPP. Application VPP App may not have been aware that a cold, respectively, warm reset operation has occurred. If information CR Num VPP and CR Num, respectively WR Num VPP and WR Num, coincides (output same in FIG. 6) the next step is step 403 (Execute VPP App). Otherwise (output different in FIG. 6), the next step is step 404 (Adjust CR Num, WR Num).

According to an alternative embodiment, an application on hold could at each of its resets verify its information CR Num and WR Num by comparing it with the information CR Num VPP and WR Num VPP of the primary platform.

At step 403, data CR Num VPP and CR Num, respectively WR Num VPP and WR Num, coincide, application VPP App has not "missed" a cold, respectively warm, reset operation. Application VPP App can execute.

At step 404, the information CR Num, respectively the information WR Num, of application VPP App is made equal to the information CR Num VPP, respectively the information WR Num VPP, of primary platform VPP. Primary platform VPP updates the information CR Num and/or WR Num of application VPP App.

At a step 405 (Inform VPP App), successive to step 404, primary platform VPP informs application VPP App that a reset operation has occurred. Further, primary platform VPP informs application VPP App of whether this operation was a cold or warm reset operation.

It is possible for application VPP App not to have been aware of a plurality of cold and/or warm consecutive operations. If there is, among the plurality of reset operations, at least one cold reset operation, primary platform VPP indicates to application VPP App that a cold reset operation has occurred. Otherwise, primary platform VPP indicates to application VPP App that a warm reset operation has occurred. According to an alternative embodiment, during the implementation of a plurality of successive warm reset operations, primary platform VPP might indicate the number of warm reset operations carried out to application VPP before its execution.

At a step 406 (VPP App Protocol), successive to step 405, application VPP App takes into account the information received at step 405 from the primary platform, and then executes a protocol specific to the type of reset operation which has occurred. Examples of protocol are described in relation with FIG. 7.

An advantage of this embodiment is that is enables an application not to "miss" any reset operation, and to thus leave it the possibility to erase all or part of its temporary execution data.

Figure 7:
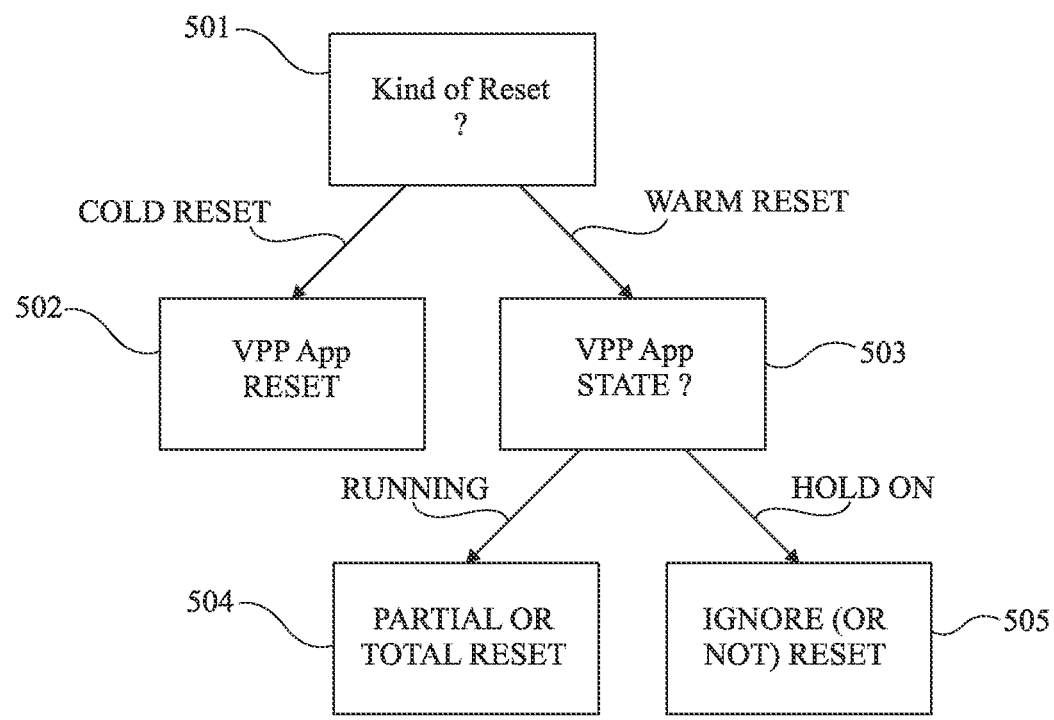
FIG. 7 schematically shows, in the form of blocks, a flowchart illustrating an implementation mode of a method of starting an application with an electronic device of the type of those described in relation with FIGS. 1 and 2.

FIG. 7 schematically shows in the form of blocks a timing diagram illustrating an example of protocol of the application VPP App of FIG. 6, implemented during the step 406 described in relation with FIG. 6.

As a reminder, at step 406 of FIG. 6, application VPP App has been informed, by the primary platform VPP of secure element SE, that an operation of resetting of element SE, and/or of the electronic device comprising it, has occurred. Its information CR Num and WR Num has been updated to correspond to the information CR Num VPP and WR Num VPP of primary platform VPP.

FIG. 7 shows an example of a protocol implemented by application VPP App. It will be understood by those skilled in the art that all sorts of protocols can be envisaged. In particular, this protocol is selected by the designer of the application.

At a step 501 (Kind of Reset?), application VPP App processes the information that it has received from primary platform VPP. In particular, application VPP App determines whether the reset operation which has occurred is a cold reset operation or a warm reset operation. If the reset operation is a cold reset operation (output COLD RESET in FIG. 7), then the next step is a step 502 (VPP App RESET). If the reset operation is a warm reset operation (output WARM RESET in FIG. 7) then the next step is a step 503 (VPP App State?).

At step 502, application VPP App is aware that a cold reset operation has occurred. As previously mentioned, during a cold reset operation, the volatile memory of secure element SE is erased. Further, when application VPP App is active, part of these execution data may be stored in a non-volatile memory.

According to an example, after having realized that a cold reset operation has occurred, application VPP App verifies that all its temporary execution data have effectively been erased from the different memories of secure element SE. According to a variant, application VPP App recovers the data which have not been erased.

At step 503, application VPP App is aware that a warm reset operation has occurred. As previously mentioned, during a warm reset operation, the information that a software reset is requested has circulated. However, if application VPP App was on hold, it may have missed this information. Thus, when the application is running at the time when the warm reset operation occurs (output RUNNING in FIG. 7), the next step is a step 504 (PARTIAL OR TOTAL RESET). If the application is on hold at the time when a warm reset operation has occurred, then the next step is a step 505 (IGNORE (OR NOT) RESET). It should be noted that if application VPP App is inactive at the time of a warm or cold reset operation, the operation may have no incidence on its operation since neither its execution code, nor its execution data are loaded into a volatile memory of secure element SE.

At step 504, application VPP App was running during the warm reset operation. Application VPP App may perform a total or partial reset. According to an embodiment, the application may erase all its temporary execution data. According to another example, the application may keep general temporary execution data, and only erase temporary execution data linked to one or a plurality of its functions.

At step 505, application VPP App was on hold during the warm reset operation. According to an example, the operation may, as if it had been running, perform a total or partial reset. According to another example, application VPP App may decide to ignore the warm reset operation.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

What is claimed is:

1. A method for starting a first application by at least one low-level operating system of a secure element, the method comprising:
   updating first binary data implemented at a reset operation of the secure element, the updated first binary data being associated with the at least one low-level operating system; and
   comparing the updated first binary data with a second binary data associated with the first application,
   wherein the updated first binary data and the second binary data are related to the reset operation of the secure element; and
   updating the second binary data when the updated first binary data are not equal to the second binary data.

2. The method according to claim 1, wherein comparing the updated first binary data with the second binary data is performed by the at least one low-level operating system.

3. The method according to claim 1, wherein comparing the updated first binary data with the second binary data is performed by the first application.

4. The method according to claim 1, further comprising, after updating the second binary data, informing, by the first application, the at least one low-level operating system that the reset operation has occurred.

5. The method according to claim 4, wherein, after being informed, the first application implements a protocol taking into account that the reset operation has occurred.

6. The method according to claim 1, wherein the secure element implements the first application and a second application.

7. The method according to claim 1, wherein the first and second binary data are information about a cold reset operation or a warm reset operation.

8. The method according to claim 1, wherein the second binary data are updated binary data.

9. A secure element configured to implement at least one first application, the secure element comprising:
a non-transient computer-readable memory; and
a secure processor coupled to the memory and configured to:
update first binary data at a reset operation of the secure element, wherein the updated first binary data are associated with at least one low-level operating system; and
compare the updated first binary data with second binary data associated with the at least one first application,
wherein the updated first binary data and the second binary data are related to the reset operation of the secure element, and
wherein the secure element is configured to implement at least one second application.

10. The secure element according to claim 9, wherein the at least one low-level operating system is configured to compare the updated first binary data with the second binary data.

11. The secure element according to claim 9, wherein the at least one first application is configured to compare the updated first binary data with the second binary data.

12. The secure element according to claim 9, wherein the secure processor is configured to update the second binary data when the updated first binary data are not equal to the second binary data.

13. The secure element according to claim 12, wherein the at least one low-level operating system is configured to, after updating the second binary data, inform the at least one first application that the reset operation has occurred.

14. The secure element according to claim 13, wherein the at least one first application is configured to, after being informed, implement a protocol taking into account that the reset operation has occurred.

15. The secure element according to claim 9, wherein the secure processor is configured to verify binary data at each starting of the at least one first application, and wherein the third binary data are associated with the at least one low-level operating system and are updated after each reset operation of the secure element.

16. The secure element according to claim 15, wherein the first binary data are associated with a first type of reset operation, and the third binary data are associated with a second type of reset operation.

17. The secure element according to claim 16, wherein the first type of reset operation is a cold reset operation, in which an electric power supply to the secure element is stopped.

18. The secure element according to claim 16, wherein the second type of reset operation is a warm reset operation, in which an electric power supply of the secure element is not stopped.

19. The secure element according to claim 9, wherein the secure element is embedded in an electronic device.

20. The secure element according to claim 9, wherein the secure element is integrated in an electronic device.

21. The secure element according to claim 9, wherein the second binary data are updated binary data.

22. A method for starting a first application implemented by at least one low-level operating system of a secure element, the method comprising:
verifying first binary data implemented after a reset operation of the secure element, the first binary data being associated with the at least one low-level operating system,
wherein third binary data, associated with the at least one low-level operating system and updated after each reset operation of the secure element, are verified at each start of the first application,
wherein the first binary data are associated with a first type of reset operation, and wherein the third binary data are associated with a second type of reset operation.

23. The method according to claim 22, wherein the first type of reset operation is a cold reset operation comprising stopping an electric power supply to the secure element.

24. The method according to claim 22, wherein the second type of reset operation is a warm reset operation comprising not stopping an electric power supply to the secure element.

25. The method according to claim 22,
wherein verifying the first binary data is performed by comparing the first binary data with second binary data associated with the first application, and
wherein the second binary data is updated when the first binary data are not equal to the second binary data.

26. The method according to claim 25, further comprising, after the second binary data are updated, informing, by the first application, the at least one low-level operating system that the reset operation has occurred.

27. The method according to claim 26, wherein, after being informed, the first application implements a protocol taking into account that the reset operation has occurred.

* * * * *

UNITED STATES PATENT AND TRADEMARK OFFICE
CERTIFICATE OF CORRECTION

PATENT NO. : 11,768,943 B2
APPLICATION NO. : 17/457193
DATED : September 26, 2023
INVENTOR(S) : Olivier Van Nieuwenhuyze It is certified that error appears in the above-identified patent and that said Letters Patent is hereby corrected as shown below:

In the Claims

Claim 15, Column 15, Line 42; delete "verify binary" and insert --verify third binary--

Signed and Sealed this
Seventh Day of November, 2023

Katherine Kelly Vidal
*Director of the United States Patent and Trademark Office*